United States Patent

[11] 3,555,204

[72] Inventor Richard E. Braun
Boulder, Colo.
[21] Appl. No. 697,483
[22] Filed Jan. 12, 1968
[45] Patented Jan. 12, 1971
[73] Assignee International Business Machines Corporation
Armonk, N.Y.
a corporation of New York

[54] ELECTRONIC SWEEP MAGNETIC SCANNING TRANSDUCER
10 Claims, 3 Drawing Figs.

[52] U.S. Cl. .......... 179/100.2
[51] Int. Cl. .......... G11b 5/16, G11b 5/28
[50] Field of Search .......... 179/100.2CF, 100.2T, 100.2C; 340/174.1F; 346/74MC

[56] References Cited

UNITED STATES PATENTS

| | | | |
|---|---|---|---|
| 3,175,049 | 3/1965 | Gabor .......... | 179/100.2 |
| 3,369,083 | 2/1968 | Clapper et al. .......... | 179/100.2 |
| 3,382,325 | 5/1968 | Camras .......... | 179/100.2 |
| 3,435,440 | 3/1969 | Nallin .......... | 179/100.2 |
| 3,188,399 | 6/1965 | Eldridge .......... | 179/100.2 |

OTHER REFERENCES

Magnetic Materials in the Electrical Industry, Bardell, P.R., MacDonald & Co. Publishers Ltd., London, 1960, pp. 96–101, 105–107, 108–115.

*Primary Examiner*—Bernard Konick
*Assistant Examiner*—Robert S. Tupper
*Attorneys*—Hanifin & Jancin and Roger S. Smith

ABSTRACT: A scanning transducer including plural laminations, the reluctance of which is alterable by energization of scan control windings. Each lamination has controlled width portions linked by the control windings. The widths of the portions are arranged so that they will be saturated in an orderly progression as current in the control windings is varied. Saturation of a controlled width portion of a lamination effectively places the lamination in a high reluctance state and renders it incapable of normal transducing action. One lamination at a time is allowed to remain effective and the position of this lamination is moved across the transducer by operation of the control windings.

INVENTOR
RICHARD E. BRAUN

BY [signature]
ATTORNEY

ELECTRONIC SWEEP MAGNETIC SCANNING TRANSDUCER

SUMMARY OF INVENTION

The present invention relates to magnetic transducers of the sort adapted to translate information between a magnetic record medium and electrical or electronic data handling apparatus. More specifically, the invention is directed toward magnetic transducers which are capable of scanning the magnetic medium for reading or recording without the necessity of physical movement.

In present day magnetic storage and reproducing systems, there is a need for transducer apparatus capable of scanning the associated record medium in a direction not aligned with the normal direction of travel of the medium past the transducer. Scanning transducers have been provided in various forms to satisfy this requirement. A common technique is to mount one or more transducers on a rotating support so that they sweep transversely across the medium. Other mechanical sweeping techniques have also been employed. More recently, magnetic scanning transducers that do not require mechanical motion have been suggested. Such transducers are designed to effect the sweeping action by electrical controls which sequentially render incremental portions of the device operative in such a way that the operative region moves across the transducer from one edge to the other at a controlled rate. This has been accomplished, for example, by providing multiple transducer laminations stacked in side-by-side relation, each with control winding means that are effective to alter the reluctance of the associated lamination. The control windings are energized so as to place all laminations save a selected one in a high reluctance state and, thereby, render them incapable of transducing action. The one "unblocked" lamination allowed to remain in its normal low reluctance state is effective; by manipulation of the signals applied to the control windings each lamination is made effective in turn while all others are blocked to produce the sweeping action.

The control winding means employed in prior art sweep heads of the type just described have used graded magnetic coupling to effect lamination selection. Each lamination is separately wound with a graded control winding in such a way that the number of linking turns increases from one lamination to the next. A varying scanning current is applied to a winding linking all laminations; it is controlled so that it creates a flux in each lamination in opposition to the flux of the graded windings. For particular current values, the scanning winding flux just balances the graded winding flux while in all other laminations one flux overbalances the other and saturates the laminations.

While this technique is effective to perform the scanning action, it suffers the drawback that each lamination in the transducer must be separately wound and one or more coil turns must be positioned between adjacent laminations. This, of course, makes the transducer bulky and difficult to manufacture. In addition, since the laminations must be spaced apart by winding thickness, the degree of resolution of transducing action throughout the sweep is severely limited.

It is the primary object of this invention to provide a sweep transducer which avoids the problems just discussed and yet operates without mechanical apparatus.

More specifically, it is an object of this invention to provide an electronic sweep transducer having fine sweep resolution and enjoying simplicity and ease of manufacture.

Another object of the invention is to provide a sweep transducer of the type described wherein sweep action is effected by control of the reluctance of the several laminations through energization of control winding means linking all laminations in common.

The present invention takes advantage of the fact that the reluctance of a magnetic body is a function of the physical dimensions of the body as well as the characteristics of the material of which it is formed. Accordingly, each lamination of the transducer of this invention is arranged to have controlled saturation portions that vary from lamination to lamination, and that effectively alter the reluctance of the total magnetic path through the lamination under control of flux induced in them by common control winding means. These controlled saturation portions have carefully controlled physical dimensions that vary in size from one lamination to the next so that an effective grading exists across the transducer. By controlling the current magnitude in the common control winding linking these controlled dimension portions, the laminations may be placed in a high reluctance state in sequential fashion.

The foregoing and other objects, features and advantages of the invention will be apparent from the following more particular description of preferred embodiments of the invention, as illustrated in the accompanying drawings.

DETAILED DESCRIPTION

Figure 1:
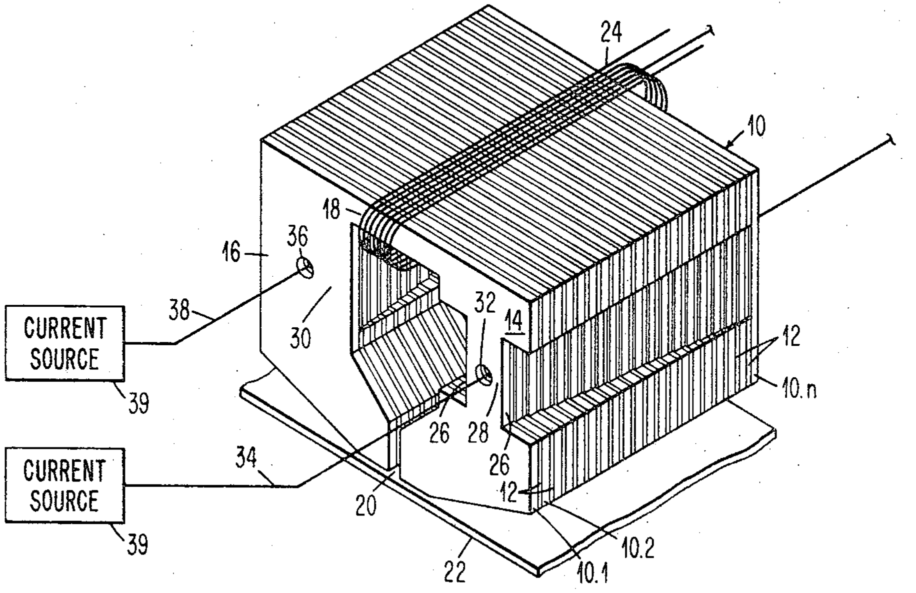
FIG. 1 is a perspective view of a multilamination transducer embodying the present invention.

Referring now in detail to the drawings, there is shown in FIG. 1 a transducer 10 which incorporates this invention. The transducer 10 includes a plurality of magnetic laminations 10.1, 10.2 ... 10.*n* arranged in side-by-side relation with insulating spacers 12 of copper or other nonmagnetic material therebetween. The laminations and spacers are suitably bonded together, for example by epoxy, to form a unitary structure. While it is not shown, an appropriate supporting frame may also be included. Each lamination is made up of two pole pieces or legs 14 and 16 joined at one end by a base leg 18. At their opposite ends, the pole pieces 14 and 16 are separated to provide a transducing gap 20. As may be seen from FIG. 1, the several laminations are positioned so that the gaps 20 are aligned and form one continuous gap across the width of the transducer 10.

The transducer 10 is adapted to record and read information from a record medium 22, such as a magnetic tape. The transducer 10 is positioned with the gaps 20 extending across the width of the medium and, as will presently be described, is controlled so that the effective transducing portion moves across the medium in an orderly fashion from one side edge to the other. Reading or writing may thus be accomplished with respect to the portion of the medium adjacent the gap without necessitating mechanical movement of the transducer 10 or the tape 22. The tape may, of course, be moved longitudinally, either continuously or incrementally, to bring new areas under the influence of the gap 20 as required.

Data signals are applied to the transducer 10 for recording by means of data signal winding 24 coupled in common to the base legs 18 of all laminations. Signals impressed upon winding 24 induce recording flux in a path that includes the transducing gap 20 of each lamination. Because of the nonmagnetic spacers 12 between laminations, there is effectively no flux flow from one lamination to the next and magnetic cross talk is eliminated. The data signal winding 24 may also be employed as a sense winding to detect flux variations in the laminations during readout or playback operation.

To control the reluctance of the several laminations and thereby produce the desired scanning action, each lamination 10.1—10.*n* is provided with control saturation portions in the legs 14 and 16 thereof. As may be seen in FIG. 1, leg 14 of lamination 10.1 has a notch 26 cut therein to provide a narrowed leg region 28. The corresponding legs 14 of the subsequent laminations 10.2—10.n1 are similarly notched, but the notches are made increasingly shallower in each subsequent lamination so that the narrowed leg region of each successive lamination is a predetermined amount wider than the preceding one. Similar notches 29 (shown best in FIG. 2) are cut in the legs 16 of the several laminations 10.2—10.n, but these notches are shallowest in the leg 16 of lamination 10.2 and they become progressively deeper in successive laminations so that the legs 16 have controlled width portions 30 that narrow progressively from lamination 10.1 to 10.n.

The controlled saturation portions 28 of the legs 14 are provided with centrally located apertures 32 through which a common control winding 34 is threaded, and the controlled saturation portions 30 of legs 16 have corresponding centrally located apertures 36 that carry a common control winding 38. Each control winding is coupled to a control current source 39 capable of supplying current of variable magnitude.

It will be appreciated that current flowing through a control winding 34 or 38 will induce magnetic flux in the associated leg portion 28 or 30 about the aperture 32 or 36. This flux does not affect the entire lamination and does not extend through the gap 20 since the control winding does not link the entire magnetic circuit of the lamination. The control flux does, however, affect the controlled width portion 28 or 30 of the leg containing the aperture and, depending upon the magnitude of the control winding current, can saturate the portion 28 or 30. The amount of flux required to saturate the portion 28 or 30 depends upon the cross-sectional area of the portion. Since the area is a function of width, the width determines the saturation level. If saturation exists, the effective reluctance of the entire lamination is increased, because the saturated portion is part of the magnetic circuit through the lamination. Either control winding is thus capable of effectively saturating a lamination by saturating the controlled width portion 28 or 30 that it links, without affecting the gap 20. When the lamination is so saturated it is rendered incapable of normal transducing action for either recording or playback.

Figure 2:
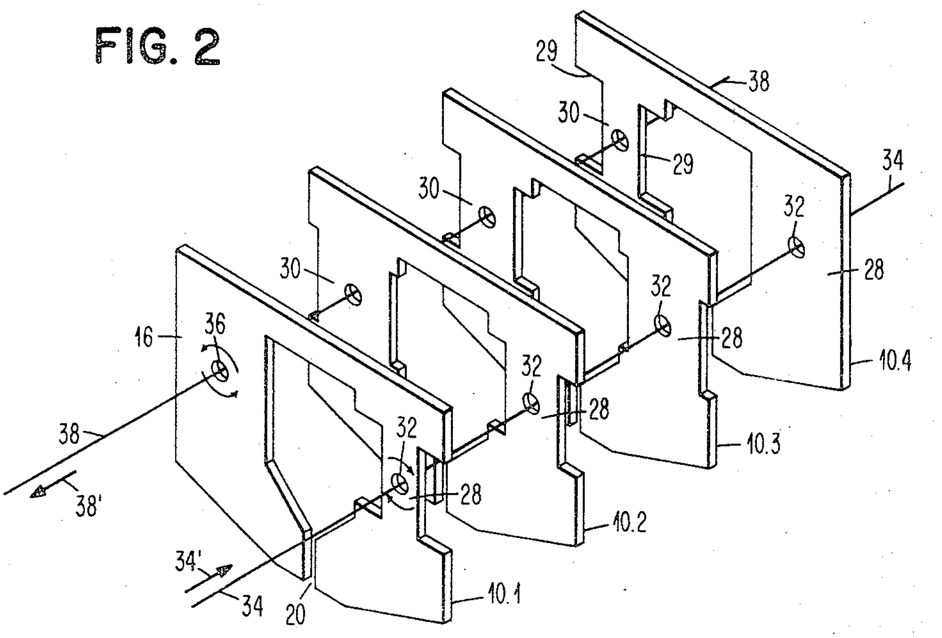
FIG. 2 is an exploded perspective illustration of an embodiment of the invention showing only four laminations for purposes of illustration of the invention.
Figure 3:
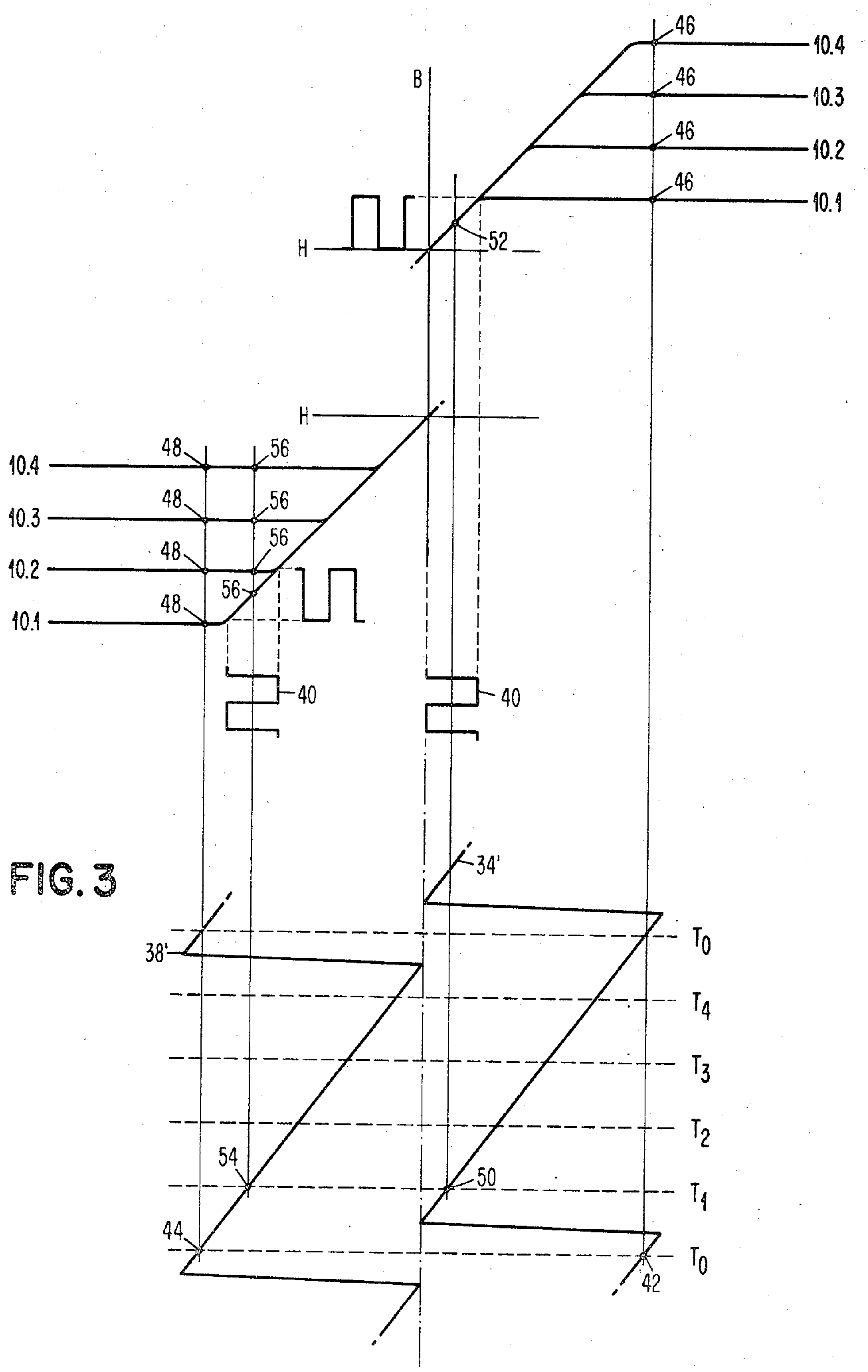
FIG. 3 is a waveform and hysteresis diagram illustrating how the control signals and data signals affect the four laminations of FIG. 2.

The means by which the two control windings are utilized to saturate all laminations but one, and to move the position of the one unsaturated lamination from the first to the nth lamination in the transducer will be described with the aid of FIGS. 2 and 3 of the drawings. For the sake of simplicity, only four laminations are shown in FIG. 2, and the interlamination spacers 12 are omitted. The laminations are identified as 10.1 through 10.4 and the reference characters employed in FIG. 1 are used to identify like elements in FIG. 2. In FIG. 3, there are shown partial hysteresis curves for the controlled width portions 28 of the legs 14 of the four laminations and partial hysteresis diagrams for the controlled width portions of the legs 16. The general shape of the hysteresis curves is somewhat stylized for convenience, but represents the general characteristic of a conventional magnetic transducer material such as permalloy or mumetal. As may be seen, the material has a generally linear response to applied field until a saturation flux density is reached. Upon reaching this density, the material is nearly insensitive to increased field. By virtue of the difference in width of the portions 28 of the several laminations, the field strength necessary to saturate the portion changes from lamination to lamination; the wider the portion 28 is, the more flux it can support before becoming saturated. Thus, as shown in FIG. 3, the portion 28 of lamination 10.1 has a low saturation level, the portion 28 of lamination 10.2 has a somewhat higher saturation level, and so on. Similarly, in FIG. 3, the portion 30 of lamination 10.4 (which is narrowest) has a low saturation level and the corresponding portions 30 of laminations 10.3, 10.2 and 10.1 have increasingly higher levels. For ease in control, the dimension portions 28 in lamination 10.1 through 10.4 are made the same as those of the portions 30, although in reverse order, so that the same current magnitude may be employed in winding 34 to saturate lamination 10.1 as is employed in winding 38 to saturate lamination 10.4, and so on.

FIG. 3 shows the current waveforms 34′ and 38′ which are impressed upon the control windings 34 and 38 to effect a sweep action in the assembly of FIG. 2, and the time relation between them. Since the field induced in each lamination section 28 or 30 is directly proportional to current magnitude, the flux states to which the laminations are brought by the control currents may be visualized by considering the current waveforms as field strength diagrams and plotting the points on the several hysteresis curves at which the control current fields place the magnetic conditions of the several laminations. It is assumed in FIG. 3 that the current in winding 34 is in a direction to magnetize the portions 28 clockwise around apertures 32 (upper right quadrant of the hysteresis diagram of FIG. 3) and that the current direction in winding 38 is such as to magnetize the portions 30 counterclockwise about apertures 36 (lower right quadrant of the hysteresis diagram of FIG. 3).

To understand the scanning operation of the device, let it be assumed that the ramp or sawtooth current waveforms 34′ and 38′ are applied to the control windings 34 and 38 in the time relation shown in FIG. 3 and that a data signal is concurrently applied to data signal winding 24, the data signal having the amplitude shown at 40 in FIG. 3. It will be observed that at time TO, both windings 34 and 38 carry a high level of current as indicated by reference characters 42 and 44. The current level 42 in winding 34 is sufficient to produce a saturating field in the controlled width portion 28 of each of the four laminations and places each portion at the points 46 on its respective hysteresis curve. Under this condition, the laminations are all in a high reluctance state and incapable of transducing action. Field changes created by data winding 24 merely move the laminations back and forth along the saturation portion of their hysteresis loops. The same situation exists with respect to the portions 30, since current level 44 in winding 38 also saturates these portions, bringing them each to points 48 on their hysteresis loops.

At time T1, the current magnitude in winding 34 has dropped to zero and increased to the level 50. The field produced in the portions 28 places all of them at point 52 on the relatively linear portion of their loops. Each portion 28 is, at this time, in its normal low reluctance state and will support flux changes created by signal winding 24. Control winding 38, however, carriers a fairly high current level 54, which places the several portions 30 of the laminations 10.1—10.4 at the points 56 on their respective loops. It will be observed that the portion 30 of laminations 10.2, 10.3 and 10.4 are still well saturated, so these three laminations are in a high reluctance state. The recording current in data winding 24 is not capable of producing sufficient flux changes in the gaps 20 of these laminations. Only lamination 10.1 is available for recording.

At time T2, the current in winding 34 has increased sufficiently to saturate portion 28 of lamination 10.1 and the current in winding 38 has decreased sufficiently to move portion 30 of lamination 10.2 out of saturation. At this time, lamination 10.1 is blocked by winding 34 and laminations 10.3 and 10.4 are blocked by winding 38. Lamination 10.2 alone responds to data winding 24.

Time T3 finds both laminations 10.1 and 10.2 blocked by saturation of their portions 28, and lamination 10.4 blocked by saturation of its portion 30. Lamination 10.3 will, however, transduce information.

At time T4 the current in winding 34 saturates the portions 28 of laminations 10.1, 10.2, and 10.3, while the current in winding 38 does not saturate any portion 30. Lamination 10.4 now is made the sole active lamination.

It will be seen from the foregoing that the control windings, operating in concert as described have moved the sole active laminations across the stack of laminations during T1—T1 T4 in an orderly sequence. It should be understood that the various diagrams of FIG. 3 are illustrative only, and are not intended as accurate representation of actual embodiments. They are useful only as an aid in understanding the phenomenon which occurs when control signals are applied to the several laminations. Applying the control concept just described to the apparatus of FIG. 1, it can be seen that any number $n$ of laminations may be controlled in this fashion during $n$ time periods by applying concurrently increasing and decreasing currents to the common control windings of the assembly. As explained hereinbefore, the control currents, in combination with the controlled width portions of the various laminations are able to maintain all but one lamination in a high reluctance condition which disables them from effectively responding to flux changes caused by data signals in the data winding or magnetic patterns in the media beneath their working gaps. An important feature of the invention is the fact that the control flux which controls the reluctance state of any lamination does not itself extend to the working gap and does not perform any recording or erasing function.

In the embodiments hereinbefore described, sweeping action is accomplished by blocking all but a desired lamination at one time so that an applied data signal, or a received playback signal is transduced only by that single lamination. It will be appreciated, of course, that desired specialized effects may be achieved by modifying the assembly to unblock groups of laminations, or several spaced-apart laminations, in the stack. In addition, it is possible, particularly in recording transducers, to operate with only one controlled width portion for each lamination. In such a case, the entire width of the transducer may be initially unblocked and the blocking action then caused to move across the transducer until all laminations are eventually blocked. Proper recording can be accomplished by continuously writing over (and thus erasing) the entire effective area of the combined working gap, each bit of information only being permanently recorded when the lamination that wrote the bit is blocked against rewriting when the next bit is recorded. This form of operation is, of course, limited to certain recording codes.

It will also be understood by those skilled in the art that variations may be made in the pattern of the controlled width portions of the transducer to accommodate different control waveforms. For example, the widths of the various portions 28 and 30 may be arranged to effect an orderly sweep when sinusoidal control currents are supplied, rather than ramp-type currents.

While the invention has been particularly shown and described with reference to preferred embodiments thereof, it will be understood by those skilled in the art that various changes in form and details may be made therein without departing from the spirit and scope of the invention.

I claim:

1. An improved magnetic transducer including a plurality of magnetic laminations formed from material utilized in a nonsquare hysteresis loop mode arrayed in side-by-side order, each lamination formed of a continuous piece of magnetic material which is cut to provide a magnetic circuit including a working gap, and a data winding coupling said laminations, wherein the improvement comprises:

a. a plurality of controlled saturation portions in each magnetic lamination each having a magnetic saturation characteristic different from the saturation characteristic of a corresponding portion in another lamination;
b. common control winding means magnetically linked to all said corresponding controlled saturation portions in the plurality of laminations; and
c. control means for supplying variable magnitude current to said control winding means for saturating said controlled saturation portions in a predetermined order and thereby increasing the effective reluctance of the laminations.

2. The invention defined in claim 1 wherein the control winding means links each controlled saturation portion of each lamination through an aperture provided in said portion.

3. The invention defined in claim 1 wherein each said controlled saturation portion of each lamination comprises a portion of the lamination having a controlled cross-sectional area.

4. The invention defined in claim 3 wherein the laminations all have substantially the same thickness and each controlled cross-sectional area is provided by controlling the width of the controlled saturation portion of each lamination.

5. The invention defined in claim 1 wherein the magnetic laminations are arranged in a stack of $n$ laminations each having at least two controlled saturation portions, separated by nonmagnetic spacers, and wherein $n$th corresponding controlled saturation portion of each lamination, from the first to the $n$the in the case of the one portion and from the $n$the to the first in the case of another portion, has a higher saturation level than the preceeding lamination and a lower saturation level than the succeeding lamination, and wherein the common control winding means links each corresponding controlled saturation portion through an aperture in said portion.

6. The invention defined in claim 5 wherein each said controlled saturation portion of each lamination comprises a part of the lamination having a controlled cross-sectional area different from the cross-sectional area of the corresponding portions of he other laminations, and wherein the aperture in each said portion is centrally located within the controlled cross-sectional area.

7. The invention defined in claim 6 wherein the control means supplies current of a generally ramp-type waveform, to saturate the controlled saturation portions of the laminations in sequence from the first lamination to the $n$th lamination.

8. An improved magnetic sweep head including $n$ magnetic laminations arranged in side-by-side order, each lamination forming a magnetic circuit including a working gap, nonmagnetic spacer means interleaved with said laminations to magnetically isolate them, and a data winding coupled to all said magnetic laminations, wherein the improvement comprises:

a. first and second controlled saturation portions in each magnetic lamination forming part of the magnetic circuit thereof, the corresponding first controlled saturation portions in the $n$ laminations having increasingly larger saturation levels from the first lamination to the $n$th lamination and the corresponding second controlled saturation portions having increasingly smaller saturation levels from the first lamination to the $n$th lamination, each said first or second controlled saturation portion operating when saturated to effectively increase the reluctance of the magnetic circuit of its lamination and to prevent normal transducing action at the working gap;
b. first and second common control winding means respectively coupled to all said corresponding first and second controlled saturation portions and operable upon energization to induce flux in the portions coupled thereto; and c. first and second energizing means connected respectively to said first and second control winding means, the first and second energizing means being operable in concert to apply current to said first and second winding means sufficient to saturate either the first or the second controlled saturation portion of all laminations except a desired lamination whereby to render all laminations except the desired one inoperative for normal transducing action.

9. The invention defined in claim 8 wherein the energizing means concurrently supplies a ramp-type waveform of increasing current magnitude to the first control winding to saturate the first controlled saturation portions of the laminations in sequence while simultaneously unsaturating the second controlled saturation portions in sequence to effectively render each lamination from the first to the $n$th operative for transducing action while maintaining the others inoperative.

10. The invention defined in claim 9 wherein each first and second controlled saturation portion comprises a controlled cross-sectional area portion of the lamination having an aperture therein, and wherein the first and second control winding means are threaded through the aperture of the portions they couple.